(12) United States Patent
Okuno et al.

(10) Patent No.: US 11,460,061 B2
(45) Date of Patent: Oct. 4, 2022

(54) JOINED COMPONENT

(71) Applicant: SUMITOMO ELECTRIC SINTERED ALLOY, LTD., Okayama (JP)

(72) Inventors: Reiko Okuno, Hyogo (JP); Masaaki Eida, Hyogo (JP)

(73) Assignee: SUMITOMO ELECTRIC SINTERED ALLOY, LTD., Okayama (JP)

( * ) Notice: Subject to any disclaimer, the term of this patent is extended or adjusted under 35 U.S.C. 154(b) by 464 days.

(21) Appl. No.: 16/629,621

(22) PCT Filed: Jul. 23, 2018

(86) PCT No.: PCT/JP2018/027439
§ 371 (c)(1),
(2) Date: Jan. 9, 2020

(87) PCT Pub. No.: WO2019/031210
PCT Pub. Date: Feb. 14, 2019

(65) Prior Publication Data
US 2021/0033124 A1 Feb. 4, 2021

(30) Foreign Application Priority Data
Aug. 9, 2017 (JP) .............................. JP2017-154825

(51) Int. Cl.
*F16B 5/08* (2006.01)
*B23K 1/00* (2006.01)
*B23K 33/00* (2006.01)

(52) U.S. Cl.
CPC .............. *F16B 5/08* (2013.01); *B23K 1/0008* (2013.01); *B23K 33/00* (2013.01); *Y10T 403/473* (2015.01)

(58) Field of Classification Search
CPC ..... F16B 5/08; Y10T 403/473; B23K 1/0008; B23K 1/14; B23K 1/16; B23K 1/18
See application file for complete search history.

(56) References Cited

U.S. PATENT DOCUMENTS 3,324,544 A * 6/1967 Haller .................... F16B 17/008
403/267
4,449,027 A * 5/1984 Fujikawa .................. B23H 7/26
219/69.15
(Continued)

FOREIGN PATENT DOCUMENTS

EP 3626961 A1 * 3/2020
JP H11-90622 4/1999
(Continued)

*Primary Examiner* — Jonathan P Masinick
(74) *Attorney, Agent, or Firm* — IPUSA, PLLC

(57) ABSTRACT

A joined component includes a first member provided with a first joint surface having an arranging part where a brazing filler material is arranged, a second member joined to the first member by brazing, and provided with a second joint surface having an accommodating recess that opposes the arranging part, a guide groove formed in the first joint surface or the second joint surface, and extending from the arranging part or the accommodating recess toward a fringe of the first joint surface or the second joint surface, and a chamfer formed along the fringe of the first joint surface or the second joint surface, and the guide groove communicates to the chamfer.

15 Claims, 3 Drawing Sheets

(56) References Cited

U.S. PATENT DOCUMENTS

| | | | | |
|---|---|---|---|---|
| 6,902,825 | B2* | 6/2005 | Yano | B23K 1/0008 |
| | | | | 428/609 |
| 8,753,753 | B2* | 6/2014 | Lemke | B23K 1/20 |
| | | | | 428/603 |
| 10,576,586 | B2* | 3/2020 | Frey | B32B 15/01 |
| 10,603,732 | B2* | 3/2020 | Hirono | B23K 1/19 |
| 10,788,069 | B2* | 9/2020 | Uozumi | B23K 1/19 |
| 2006/0275607 | A1* | 12/2006 | Demir | B22F 7/06 |
| | | | | 428/408 |
| 2013/0336710 | A1* | 12/2013 | Chou | B29C 66/1282 |
| | | | | 403/270 |
| 2017/0252844 | A1 | 9/2017 | Hirono et al. | |
| 2018/0073535 | A1 | 3/2018 | Uozumi et al. | |

FOREIGN PATENT DOCUMENTS

| | | | |
|---|---|---|---|
| JP | 2001-138041 | | 5/2001 |
| JP | 2008-290105 | | 12/2008 |
| JP | 2008-302415 | | 12/2008 |
| JP | 2008-545938 | | 12/2008 |
| JP | 2016-190242 | | 11/2016 |
| KR | 20170087599 A | * | 7/2017 |
| KR | 20200025268 A | * | 3/2020 |
| WO | 2006/130957 | | 12/2006 |
| WO | 2016/031500 | | 3/2016 |

* cited by examiner

JOINED COMPONENT

TECHNICAL FIELD

The present invention relates to a joined component.

This application is based upon and claims priority to Japanese Patent Application No. 2017-154825, filed on Aug. 9, 2017, the entire contents of which are incorporated herein by reference.

BACKGROUND ART

Patent Document 1 describes a technique related to joining sintered parts by brazing.

PRIOR ART DOCUMENTS

Patent Documents

Patent Document 1: Japanese Laid-Open Patent Publication No. 2008-302415

DISCLOSURE OF THE INVENTION

A joined component according to the present disclosure includes a first member provided with a first joint surface having an arranging part where a brazing filler material is arranged;

a second member joined to the first member by brazing, and provided with a second joint surface having an accommodating recess that opposes the arranging part;

a guide groove formed in the first joint surface or the second joint surface, and extending from the arranging part or the accommodating recess toward a fringe of the first joint surface or the second joint surface; and a chamfer formed along the fringe of the first joint surface or the second joint surface, wherein the guide groove communicates to the chamfer.

MODE OF CARRYING OUT THE INVENTION

Figure 1:
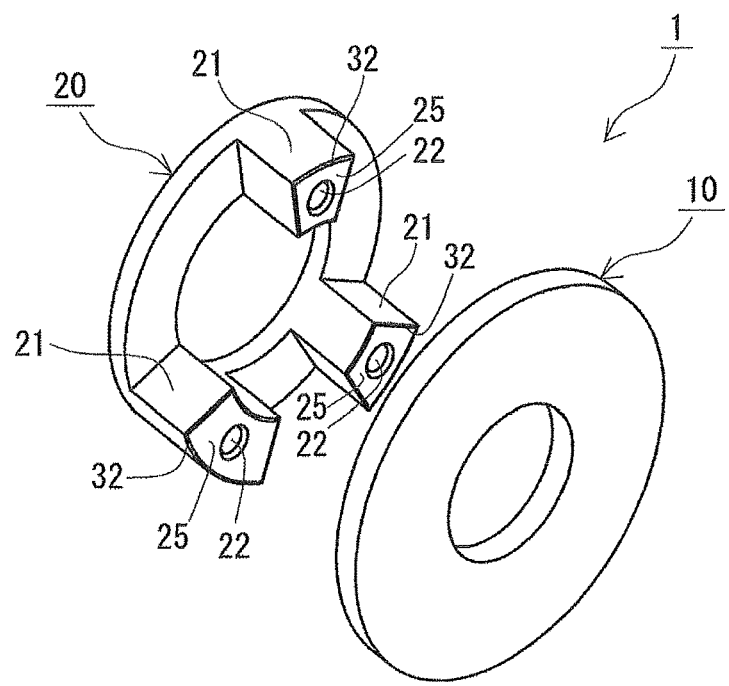
FIG. 1 is a schematic disassembled perspective view of a joined component according to an embodiment 1.

Sintered bodies manufactured by powder metallurgy are used in various mechanical components, such as automobile components or the like. Because the sintered body is formed by molding and sintering, there are restrictions to the shape thereof. For this reason, when forming the component having a shape that is impossible or difficult to manufacture by the molding, the component is divided into a plurality of moldable members, and the moldable members are joined to foil a joined component that is a single component.

[Problem to be Solved by the Invention]

In the joined component that is obtained by brazing, it is desirable to solve the problem of a brazing filler material that oozes out from a fringe of a joint surface. According to the technique described in Patent Document 1, the brazing filler material that oozes out is reduced by closing a terminal end of a guide groove provided at the joint surface, but in some cases, it may not be possible to sufficiently reduce the brazing filler material that oozes out.

Accordingly, it is one object to provide a joined component that can effectively reduce the brazing filler material that oozes out from the fringe of the joint surface.

[Effects of Present Disclosure]

According to the present disclosure, it is possible to effectively reduce the brazing filler material that oozes out from the fringe of the joint surface.

[Description of Embodiments of Present Invention]

In a conventional joined component that is obtained by brazing, a through hole is generally provided in a second member to arrange a brazing filler material, and when joining a first member and the second member, a chip of the brazing filler material is inserted from the through hole in a state where the first member and the second member overlap. In addition, when the brazing filler material is heated and melted for the joining, a part of the melted brazing filler material may remain within the through hole, and the residual brazing filler material may remain in a state adhered inside the through hole after the joining by the brazing. When the residual brazing filler material remains inside the through hole, the residual brazing filler material may fall off from the joined component via the through hole, and may cause undesirable effects on a product that uses the joined component.

In order to avoid inconveniences caused by the residual brazing filler material inside the through hole falling off therefrom, it is conceivable to modify the through hole to a non-penetrating recess, and arrange and accommodate the brazing filler material in this recess. However, in this case, in the state where the first member and the second member overlap, joint surfaces of the first member and the second member adhere to each other, and an internal space formed by the recess forms a closed space. In addition, when the brazing filler material is heated and melted, thermal expansion of a gas inside the recess may occur, and a gas may be generated from the melted brazing filler material, to raise an internal pressure of the recess. For this reason, the gas may cause the melted brazing filler material to be discharged and ooze out from the fringe of the joint surface. According to the technique described in Patent Document 1, the guide groove is provided at the joint surface, but since the terminal end of the guide groove is closed, it is not possible to prevent the rise in the internal pressure of the recess generated when the brazing filler material is melted, and the brazing filler material that oozes out cannot be sufficiently reduced because the brazing filler material that oozes out due to the gas cannot be reduced in some cases.

The present inventors considered making the terminal end of the guide groove provided at the joint surface an open end, when providing the recess that accommodates the brazing filler material in the joined component, so as to utilize this guide groove as a passage for the gas that is generated when the brazing filler material is melted. As a result, the present inventors conceived that this arrangement can reduce the rise in the internal pressure of the recess when the brazing filler material is melted, and reduce the brazing filler material that oozes out due to the gas, to solve the problem of the brazing filler material that oozes out. Next, embodiments of the present invention will be presented and described.

(1) A joined component according to one embodiment of the present invention includes a first member provided with a first joint surface having an arranging part where a brazing filler material is arranged;

a second member joined to the first member by brazing, and provided with a second joint surface having an accommodating recess that opposes the arranging part;

a guide groove formed in the first joint surface or the second joint surface, and extending from the arranging part or the accommodating recess toward a fringe of the first joint surface or the second joint surface; and a chamfer formed along the fringe of the first joint surface or the second joint surface, wherein the guide groove communicates to the chamfer.

In the above-mentioned joined component, when joining the first member and the second member by the brazing, the brazing filler material is accommodated in the accommodating recess that is provided in the second joint surface of the second member, and the first member and the second member are overlapped, to arrange the brazing filler material in the arranging part of the first member. In addition, the brazing filler material is melted by heating in this state, to permeate the melted brazing filler material in between the joint surfaces of the first member and the second member to joint these members by the brazing.

According to the above-mentioned joined component, because the brazing filler material is arranged and accommodated in the accommodating recess that is not a through hole, even if a part of the brazing filler material remains inside the accommodating recess after the joining by the brazing, the residual brazing filler material accumulates in the accommodating recess, and it is thus possible to prevent the residual brazing filler material from falling off from the joined component.

According to the above-mentioned joined component, because the guide groove is formed in the first joint surface or the second joint surface, the melted brazing filler material permeates in between the joint surfaces via the groove, to improve the permeability of the brazing filler material. Further, because the guide groove communicates to the chamfer that is formed along the fringe of the first joint surface or the second joint surface, the terminal end part of the guide groove is open when the brazing filler material is heated and melted. For this reason, the guide groove can be utilized as a passage for the gas that is generated when the brazing filler material is melted. The rise in the internal pressure of the accommodating recess can be reduced when the brazing filler material is heated and melted, and it is possible to reduce the melted brazing filler material that is discharged from the fringe of the joint surface due to the gas and oozes out, to eliminate the brazing filler material that oozes out due to the gas. Moreover, according to the above-mentioned joined component, the chamfer is formed along the fringe of the first joint surface or the second joint surface, and hence, the chamfer can be utilized as an accumulating part for the brazing filler material.

More particularly, even if the melted brazing filler material oozes out from the terminal end part of the guide groove when the brazing filler material is heated and melted, the brazing filler material is accumulated at the chamfer, to reduce the brazing filler material that oozes out from the fringe of the joint surface. Accordingly, the above-mentioned joined component can effective reduce the brazing filler material that oozes out from the fringe of the joint surface, and eliminate the problem of the brazing filler material that oozes out.

(2) In one embodiment of the above-mentioned joined component, the first joint surface includes the guide groove, the chamfer is formed along the fringe of the second joint surface, and a terminal end part of the guide groove is positioned in a range overlapping the chamfer.

By positioning the terminating end part of the guide groove in the range overlapping the chamfer, the terminal end part of the guide groove is concealed by the chamfer when viewing the appearance of the joint part of the first member and the second member. For this reason, it is possible to more effectively reduce the brazing filler material that oozes out.

(3) In one embodiment of the above-mentioned joined component, the second joint surface includes the guide groove, the chamfer is formed along the fringe of the first joint surface, and a terminal end part of the guide groove is positioned in a range overlapping the chamfer.

By positioning the terminating end part of the guide groove in the range overlapping the chamfer, the terminal end part of the guide groove is concealed by the chamfer when viewing the appearance of the joint part of the first member and the second member. For this reason, it is possible to more effectively reduce the brazing filler material that oozes out.

(4) In one embodiment of the above-mentioned joined component, the chamfer has a depth of 0.05 mm or greater and 1.0 mm or less, and a width of 0.1 mm or greater and 1.5 mm or less.

When the depth and the width of the chamfer satisfy the above-mentioned ranges, the chamfer can sufficiently function as the part where the brazing filler material, that oozes out from the terminal end part of the guide groove, is accumulated when the brazing filler material is heated and melted. When the chamfer has the depth of 0.05 mm or greater and the width of 0.1 mm or greater, it is possible to secure a volume of the space formed by the chamfer, and sufficiently utilize the chamfer as the part where the brazing filler material is accumulated. When the depth of the chamfer is 1.0 mm or less, it is possible to easily hold the brazing filler material that oozes out to the space of the chamfer within the space by surface tension. When the width of the chamber is 1.5 mm or less, it is possible to secure the contact area between the first member and the second member, and reduce deterioration of the bonding strength.

(5) In one embodiment of the above-mentioned joined component, the guide groove has a depth of 0.02 mm or greater and 0.2 mm or less, and a width of 0.2 mm or greater and 1.0 mm or less.

When the guide groove has the depth of 0.02 mm or greater and the width of 0.2 mm or greater, it is possible to improve the permeability of the brazing filler material in between the joint surfaces, and the guide groove can sufficiently function as the passage for the gas that is generated when the brazing filler material is melted. When the depth of the guide groove is 0.2 mm or less, the brazing filler material can easily permeate in between the joint surfaces via the groove, and the effect of improving the permeability of the brazing filler material can be obtained more easily. When the width of the guide groove is 1.0 mm or less, it is possible to secure the contact area between the first member and the second member, without unnecessarily reducing the contact area, and reduce the deterioration of the bonding strength due to the joining by the brazing.

(6) In one embodiment of the above-mentioned joined component, the first member and the second member are sintered bodies.

The sintered bodies have high dimensional accuracies, and can cope with complicated shapes, such as gear shapes or the like, and for this reason, the joined component having the first member and the second member that are sintered bodies can be suitably utilized for various mechanical components. Examples of the joined component of the sintered bodies include a planetary carrier for an automobile or the like, for example. In addition, because the sintered bodies include a large number of pores, the melted brazing filler material also permeates into the pores of the sintered bodies. Hence, when joining the first member and the second member by the brazing, the melted brazing filler material permeates into the first member and the second, at the same time as permeating in between the joint surfaces of the first member and the second member, to rigidly join the first member and the second member. The sintered bodies are preferably iron-based sintered bodies having iron-based powder (including iron powder and iron base alloy) as the main component.

(7) In one embodiment of the above-mentioned joined component, the second member includes a columnar bridge part, the second joint surface is provided on a tip end of the bridge part, the first joint surface includes a plurality of guide grooves formed radially from the arranging part, the second joint surface includes the chamfer along the fringe, a terminal end part of the guide groove is positioned in a range overlapping the chamfer, and between the fringe of the second joint surface and a fringe of the bridge part, and the first member and the second member are sintered bodies.

According to the above-mentioned joined component, it is possible to effectively reduce the brazing filler material that oozes out from the fringe of the joint surface.

[Details of Embodiment of Present Invention]

Particular examples of the joined component according to embodiments of the present invention will be described, by referring to the drawings. In the drawings, parts designated by the same reference numerals indicate the same or corresponding parts. The scope of the present invention is not limited to these examples, and is intended to include all modifications within the meaning and scope of the claims presented and equivalents thereof.

[Embodiment 1]

(Summary of Joined Component)

Figure 3:
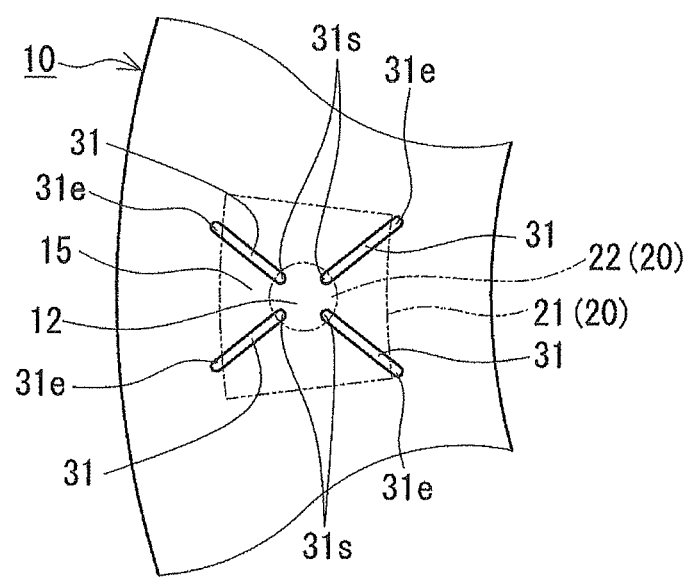
FIG. 3 is a schematic plan view illustrating a joint surface of a second member of the joined component according to the embodiment 1.
Figure 4:
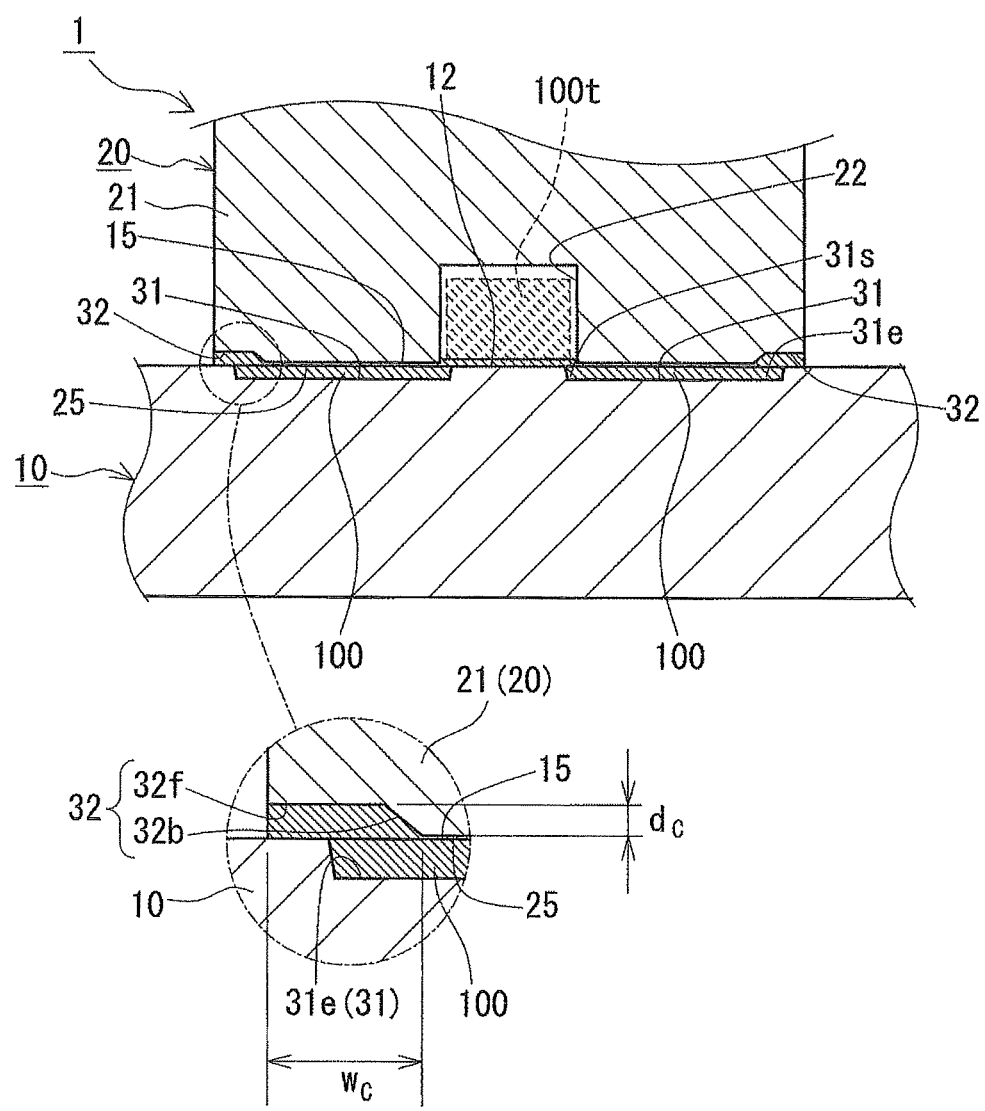
FIG. 4 is a schematic cross sectional view illustrating a cross section of a joined part of a first member and the second member of the joined component according to the embodiment 1.

A joined component 1 according to an embodiment 1 will be described, by referring to FIG. 1 through FIG. 4. The joined component 1 includes a first member 10 and a second member 20 that are joined by brazing, and the first member 10 and the second member 20 are formed by iron-based sintered bodies. This embodiment illustrates an example in which the joined component 1 is applied to a planetary carrier for an automobile transmission. One characterizing feature of the joined component 1 according to the embodiment 1 illustrated in FIG. 1 through FIG. 4 is that an accommodating recess 22 is provided in the second member 20 (refer particularly to FIG. 1 and FIG. 4). Another characterizing feature is that a chamfer 32 is formed at a fringe of a second joint surface 25 of the second member 20 (refer particularly to FIG. 4). A further characterizing feature is that at least 1 guide groove 31 is formed at a first joint surface 15 of the first member 10, and the at least 1 guide groove 31 communicates to the chamfer 32 (refer particularly to FIG. 3 and FIG. 4). In the following, a configuration of the joined component 1 will be described in detail. In the description below, the side of the first member 10 is referred to as a lower side, and the side of the second member 20 is referred to as an upper side, as illustrated in FIG. 2 and FIG. 4. A cross section of a joined part illustrated in FIG. 4 is a longitudinal section obtained by cutting the joined component 1 along the up and down direction (height direction).

(First Member)

Figure 2:
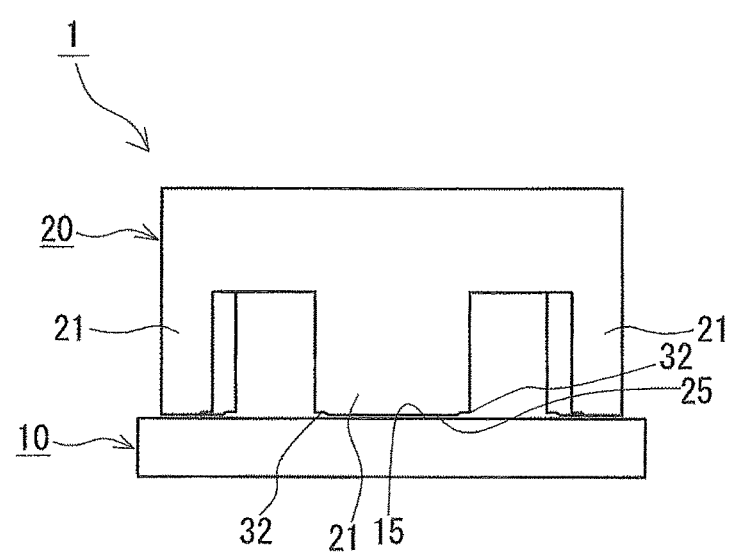
FIG. 2 is a schematic side view of the joined component according to the embodiment 1.

The first member 10 includes a ring-shaped plate as illustrated in FIG. 1 and FIG. 2, and one surface (upper surface in FIG. 2) of the first member 10 is the joined part that joins to the second member 20. In addition, as illustrated in FIG. 3, a region of the joined part, opposing an end surface of a columnar bridge part 21 (second joint surface 25) of the second member 20 which will be described later, is the first joint surface 15 (refer also to FIG. 4). In FIG. 3, the end surface of the bridge part 21 of the second member 20, and a contour of the accommodating recess 22 are respectively indicated by a two-dot chain line. As illustrated in FIG. 3, an arranging part 12 where a chip of a brazing filler material 100 (indicated by a dotted line in FIG. 4. Hereinafter also referred to as "brazing filler material chip 100f") is arranged, is provided in the joined part of the first member 10. In addition, the guide groove 31 is formed at the first joint surface 15 of the first member 10, and extends from the position of the arranging part 12 toward the fringe of the first joint surface 15. In this example, the arranging part 12 is provided approximately at the center of the first joint surface 15 as illustrated in FIGS. 3, and 4 guide grooves 31 are formed to extend radially from the position of the arranging part 12.

(Guide Groove)

As illustrated in FIG. 4, the guide groove 31 forms a passage for the brazing filler material 100 that is melted when joining the first member 10 and the second member 20 by brazing, and has a function to improve permeability of the brazing filler material by permeating the brazing filler material 100 between the first joint surface 15 and the second joint surface 25 (joint interface between the first member 10 and the second member 20) via the guide groove 31. It is sufficient to provide at least 1 guide groove 31, and the number of guide grooves 31 may be set as appropriate. In a case where a plurality of guide grooves 31 are provided, the plurality of guide grooves 31 are preferably provided radially as in the example illustrated in FIG. 3. Accordingly, the melted brazing filler material 100 can be spread uniformly through the first joint surface 15 and the second joint surface 25 in their entirety, to improve the permeability to the joint surfaces in their entirety. However, when an excessive number of guide grooves 31 are provided, a contact area (interface area) between the first member 10 and the second member 20 decreases by a corresponding amount, and may deteriorate a bonding strength of the brazing, and for this reason, the number is preferably 3 or more and 8 or less, for example.

A cross sectional shape (shape of the cross section perpendicular to the longitudinal direction) of the guide groove 31 is not particularly limited, and may be a circular arc shape, a rectangular shape, a triangular shape or a trapezoidal shape having a width that narrows toward a depth direction, or the like, for example. In this example, the cross sectional shape of the guide groove 31 is the circular arc shape.

As illustrated in FIG. 3, the guide groove 31 has a length extending from the position of the arranging part 12 and reaching the fringe of the first joint surface 15, and includes a terminal end part 31e that opens to an outer side of the fringe of the first joint surface 15 (refer also to FIG. 4). More particularly, as illustrated in FIG. 4, the terminal end part 31e of the guide groove 31 is positioned on the outer side of the fringe of the first joint surface 15 and opens to this outer side of the fringe, to communicate to the chamfer 32. The guide groove 31 that opens, refers to the guide groove 31 that is not closed by the second joint surface 25. In this example, among the 4 guide grooves 31, all of the terminal end parts 31e are open, but it is sufficient if the terminal end part 31e of at least 1 guide groove 31 is open, and the terminal end parts 31e of the remaining guide grooves 31 may be positioned on the inner side of the fringe of the first joint surface 15 and closed. In addition, as illustrated in FIG. 4, the terminal end part 31e of the guide groove 31 in this example is positioned in a range overlapping the chamfer 32 of the second member 20 which will be described later, however, the position is not limited thereto, and the terminal end part 31e may be positioned on the outer side of the chamfer 32. The terminal end part 31e of the guide groove 31 positioned in the range overlapping the chamfer 32, refers to the terminal end part 31e positioned on the outer side of the fringe of the second joint surface 25, and overlapping (concealed by) the chamfer 32 when viewed from a direction perpendicular with respect to the first joint surface 15. Further, the terminal end part 31e of the guide groove 31 positioned on the outer side of the chamfer 32, refers to the terminal end part 31e protruding (exposed) from the chamfer 32 when viewed from the direction perpendicular with respect to the first joint surface 15.

As illustrated in FIG. 3 and FIG. 4, a start end part 31s of the guide groove 31 is positioned at the arranging part 12 of the first joint surface 15 (on the inner side of the contour of accommodating recess 22 in FIG. 3), and opens to an internal space formed by the accommodating recess 22 of the second member 20 which will be described later. Accordingly, in a state before the brazing where the first member 10 and the second member 20 overlap (refer to FIG. 2), the internal space of the accommodating recess 22 communicates to the outside via the guide groove 31, as illustrated in FIG. 4. This guide groove 31 may be utilized as the passage for the gas that is generated when the brazing filler material 100 is melted.

The guide groove 31 has a size such that a depth is 0.02 mm or greater and 0.2 mm or less, and a width is 0.2 mm or greater and 1.0 mm or less, for example. When the guide groove 31 has the depth of 0.02 mm or greater and the width of 0.2 mm or greater, it is possible to improve the permeability of the brazing filler material 100 in between the first joint surface 15 and the second joint surface 25, and the guide groove 31 can sufficiently function as the passage for the gas. When the depth of the guide groove 31 is 0.2 mm or less, the brazing filler material 100 can easily permeate in between the first joint surface 15 and the second joint surface 25 via the groove, and the effect of improving the permeability can be obtained more easily. When the width of the guide groove 31 is 1.0 mm or less, it is possible to secure the contact area between the first member 10 and the second member 20, and reduce the deterioration of the bonding strength. The depth of the guide groove 31 is preferably 0.05 mm or greater and 0.15 mm or less, and the width of the guide groove 31 is preferably 0.5 mm or greater and 1.0 mm or less.

(Second Member)

The second member 20 includes a ring-shaped plate, and the columnar bridge parts 21 projecting from one surface (lower surface in FIG. 2) of this plate, as illustrated in FIG. 1 and FIG. 2, and the end surface of the bridge part 21 forms a joint part (second joint surface 25) to the first member 10 (refer also to FIG. 4). As illustrated in FIG. 1, the bridge part 21 forming the joint part of the second member 20 is provided so that the accommodating recess 22 opens to the second joint surface 25, and the accommodating recess 22 is formed at a position corresponding to the arranging part 12 of the first member (refer to FIG. 3).

The accommodating recess 22 is not a through hole, and as illustrated in FIG. 4, in a state before the brazing, accommodates therein the brazing filler material chip 100t that is to be arranged at the arranging part 12 of the first member 10. The accommodating recess 22 is formed to a size capable of accommodating an amount of the brazing filler material chip 100t required for the brazing. The shape of the accommodating recess 22 is not particularly limited, and in this example, the opening of the accommodating recess 22 has a circular shape, and the internal space of the accommodating recess 22 has a cylindrical shape. The size of the accommodating recess 22 may be set as appropriate according to the size of the brazing filler material chip 100t, and for example, the accommodating recess 22 has a diameter $\phi$ of 3 mm or greater and 10 mm or less, and a depth of 3.0 mm or greater and 10.0 mm or less.

(Chamfer)

As illustrated in FIG. 1 and FIG. 4, the chamfer 32 is formed around the perimeter of the fringe of the second joint surface (end surface of the bridge part 21) of the second member 20. As illustrated in FIG. 4, the chamfer 32 functions as a part where the brazing filler material that oozes out from the terminal end part 31e of the guide groove 31 is accumulated when the brazing filler material 100 is heated and melted. The chamfer 32 may have any size that enables the function of accumulating the brazing filler material, and has a depth of 0.05 mm or greater and 1.0 mm or less, and a width of 0.1 mm or greater and 1.5 mm or less, for example. When the chamfer 32 has the depth of 0.05 mm or greater and the width of 0.1 mm or greater, it is possible to secure a volume of the space formed by the chamfer 32, and sufficiently utilize the chamfer 32 as the part where the brazing filler material is accumulated. When the depth of the chamfer 32 is 1.0 mm or less, it is possible to easily hold the brazing filler material 100 that oozes out to the space of the chamfer 32 within the space by surface tension. When the width of the chamber 32 is 1.5 mm or less, it is possible to secure the contact area between the first member 10 and the second member 20, and reduce deterioration of the bonding strength. The depth of the chamber 32 is preferably 0.1 mm or greater and 0.5 mm or less, and the width of the chamfer 32 is preferably 0.3 mm or greater and 1.0 mm or less. The depth ($d_c$ in FIG. 4) of the chamfer 32 refers to a length of a part chamfered (cut out) from the end surface of the bridge part 21 (second joint surface 25) along a perpendicular direction (up and down direction). The width ($w_c$ in FIG. 4) of the chamfer 32 refers to a length of a part chamfered from a side surface toward the end surface of the bridge part 21.

The shape of the chamfer 32 is not particularly limited, but in the longitudinal section (cross section perpendicular to the second joint surface 25) illustrated in FIG. 4, for example, preferably has a shape including a flat surface 32f parallel to the second joint surface 25, and a sloping surface 32b joining the second joint surface 25 from the flat surface 32f and having an obtuse angle with respect to the second joint surface 25. An inclination angle of the sloping surface 32b (angle formed by extension surfaces of the sloping surface 32b and the second joint surface 25) is 30° or greater and 60° or less, and preferably 45° or less, for example. When the chamfer 32 has such a shape and the chamfer 32 is molded, an angle of a chamfer forming part of a mold does not become an acute angle, and this part is uneasily chipped.

A known brazing filler material may be used for the brazing filler material 100, and for example, Ni—Cu—Mn-based brazing filler materials are preferably used therefor. When using the Ni—Cu—Mn-based brazing filler materials, an element such as Fe, Si, B, or the like, for example, may be included as an additive component. Particular compositions of the brazing filler material 100 in mass ratio include a composition (40 to 43)% Ni-(38 to 41)% Cu-(14 to 16)% Mn-(4.5 to 5.5)% Fe-(1.6 to 2.0)% Si-(1.3 to 1.7)% B. The brazing filler material chip 100t is obtained by forming the Ni—Cu—Mn-based brazing filler material into the cylindrical shape.

(Method of Manufacturing Joined Component)

An example of a method of manufacturing the joined component 1 according to the embodiment 1 will be described. Iron-based base powder in which copper powder, graphite powder, or the like are mixed to iron powder, is pressure molded using a mold, so as to make a compact having the shape of the first member 10 and a compact having the shape of the second member 20 (refer to FIG. 1). The guide groove 31 is formed in the compact having the shape of the first member 10 during the pressure molding. The chamfer 32 and the accommodating recess 22 are formed in the compact having the shape of the second member 20 during the pressure molding. The brazing filler material chip 100t (refer to FIG. 4) is accommodated in the accommodating recess 22 of the second member 20, and the first joint surface 15 (refer to FIG. 3) and the second joint surface 25 (end surface of the bridge part 21) are abutted. In an overlapping state where the first member 10 is positioned on the lower side and the second member 20 is positioned on the upper side (refer to FIG. 2), the brazing filler material chip 100t is arranged at the arranging part 12 of the first member 10 (refer to FIG. 4). In this state, the compact of the first member 10 and the compact of the second member 20 are inserted into a heating furnace and sintered, and at the same time, the brazing filler material chip 100t is heated and melted, and the melted brazing filler material 100 is permeated between the first joint surface 15 and the second joint surface 25, to join these joint surfaces by the brazing. As a result, the first member 10 and the second member 20 become iron-based sintered bodies, respectively, and the joined component 1 of the iron-based sintered bodies is obtained.

In the joined component 1, when joining the first member 10 and the second member 20 by the brazing, a part of the melted brazing filler material 100 permeates in between the first joint surface 15 and the second joint surface 25 due to capillarity, and the remaining part permeates in between the first joint surface 15 and the second joint surface 25 via the guide groove 31. In this case, because the guide grooves 31 extend radially from the position of the arranging part 12, the melted brazing filler material 100 can be spread uniformly through the first joint surface 15 and the second joint surface 25 in their entirety. In addition, the gas that is generated when the brazing filler material 100 is melted is released to the outside via the guide groove 31, to reduce the rise in the internal pressure of the accommodating recess 22, and reduce the discharge of the melted brazing filler material 100 from the fringes of the first joint surface 15 and the second joint surface 25 due to the gas. Furthermore, because the chamfer 32 is formed, when the excess brazing filler material 100 oozes out from the terminal end part 31e of the guide groove 31, the brazing filler material 100 accumulates on the chamfer 32, to reduce the brazing filler material 100 that oozes out.

{Operation and Effects}

The joined component 1 according to the above-mentioned embodiment can obtain the following effects.

(1) Because the brazing filler material chip 100t is arranged and accommodated in the accommodating recess 22 that is not a through hole, even if a part of the brazing filler material 100 remains inside the accommodating recess 22 after the joining by the brazing, the residual brazing filler material 100 accumulates in the accommodating recess 22. Hence, it is possible to prevent the residual brazing filler material 100 inside the accommodating recess 22 from falling off from the joined component 1, and improve the reliability of the joined component 1.

(2) By forming the guide groove 31 at the first joint surface 15, the melted brazing filler material 100 can be made to permeate in between the first joint surface 15 and the second joint surface 25 via the groove, to improve the permeability of the brazing filler material. Further, because the terminal end part 31e of the guide groove 31 is open, the guide groove 31 can also be utilized as a passage for the gas that is generated when melting the brazing filler material 100. For this reason, it is possible to reduce the rise in the internal pressure of the accommodating recess 22 when the brazing filler material chip 100t is heated and melted, and effectively reduce the brazing filler material 100 that oozes out due to the gas.

(3) Because the chamfer 32 is formed on the fringe of the second joint surface 25, the chamfer 32 can be utilized as an accumulating part for the brazing filler material, and by accumulating, by the chamfer 32, the brazing filler material 100 that oozes out from the terminal end part 31e of the guide groove 31, it is possible to further reduce the brazing filler material 100 that oozes out.

(4) The terminal end part 31e of the guide groove 31 that is formed at the first joint surface 15 is positioned in a range overlapping the chamfer 32 that is formed on the fringe of the second joint surface 25. Hence, the terminal end part 31e of the guide groove 31 is concealed by the chamfer 32, and in appearance, the terminal end part 31e is uneasily visible. Of course, the terminal end part 31e of the guide groove 31 may be extended within a tolerable range, and the terminal end part 31e of the guide groove 31 may be positioned on the outer side of the chamfer 32. In this case, a length of the terminal end part 31e of the guide groove 32 exposed from the chamfer 32 may be set to 0.5 mm or less, for example.

[Modification 1]

The joined component 1 according to the embodiment 1 includes the guide groove 31 formed at the first joint surface 15 in the example described above. However, the guide groove 31 is not limited to such, and may be formed at the second joint surface 25, or may be formed at each of the first joint surface 15 and the second joint surface 25. When the guide groove 31 is formed at the second joint surface 25, the guide groove 31 communicates to the chamber 32.

[Modification 2]

In the joint component 1 according to the embodiment 1, a positioning part may be provided to position the joint surfaces of the first member 10 and the second member 20.

For example, the positioning part may be formed to include a stepped part that projects so as to surround a region that becomes the first joint surface 15 (refer to FIG. 3), and this stepped part may be used to position the bridge part 21 of the second member 20. Alternatively, a projection may be formed on one of the first joint surface 15 and the second joint surface 25, and a recess that engages the projection may be formed on the other, so as to achieve the positioning by the engagement of the projection and the recess.

[Modification 3]

In the joined component 1 according to the embodiment 1, the position of the joint part of the first member 10 and the second member 20 may be modified, and for example, the joint part may be provided at an intermediate part of the bridge part 21. In this case, a part of the bridge part 21 is provided on the second member 20, and the remaining part of the bridge part 21 is provided on the first member 10, so as to form joint surfaces by the end surfaces of the respective parts of the bridge part 21, and join these joint surfaces by the brazing. According to this configuration, the chamfer 32 may also be famed on the first joint surface 15 (end surface of the bridge part 21 on the side of the first member 10).

Preferable aspects of the present invention are appended in the following.

[Appended Claim 1]

A joint component including a first member and a second member that are joined by brazing, comprising:

an arranging part, provided on a joint part of the first member, and on which a brazing filler material is arranged;

an accommodating recess, provided in a joint part of the second member, and configured to accommodate the brazing filler material arranged on the arranging part; and at least one guide groove, formed in a joint surface of at least one of the first member and the second member, and extending from a position of the arranging part toward a fringe of the joint surface, wherein the at least one guide groove has a terminal end part that opens on a side of the fringe of the joint surface.

The joined component according to appended claim 1 has a configuration in which no chamfer is provided on a fringe part of the joint surface, in the joined component according to the above-mentioned embodiment of the present invention. Even according to this configuration, the guide groove can be utilized as a passage for the gas that is generated when the brazing filler material is melted, because the terminal end part of the guide groove is open, and thus, it is possible to reduce the rise in the internal pressure of the accommodating recess, and effectively reduce the brazing filler material that oozes out due to the gas.

[Usage of Joined Component]

The joined component according to the embodiments of the present invention may be suitably utilized for various mechanical components such as the planetary carrier or the like.

DESCRIPTION OF THE REFERENCE NUMERALS

1 Joined Component
10 First Member
12 Arranging Part
15 First Joint Surface
20 Second Member
21 Bridge Part
22 Accommodating Recess
25 Second Joint Surface
31 Guide Groove
31s Start End Part, 31e Terminal End Part
32 Chamfer
32f Flat Surface, 32b Sloping Surface
100 Brazing Filler Material
100 Brazing Filler Material Chip

The invention claimed is:

1. A joined component comprising:
a first member that includes a first joint surface having an arranging part on which a brazing filler material is arranged;
a second member that is joined to the first member by the brazing filler material, and includes a second joint surface having an accommodating recess that opposes the arranging part;
a guide groove having a first terminal end part, and a second terminal end part opposite to the first terminal end part, formed in the first joint surface or the second joint surface, and extending from the arranging part or the accommodating recess toward a fringe of the first joint surface or the second joint surface; and
a chamfer formed along the fringe of the first joint surface or the second joint surface,
wherein the first terminal end part overlaps the accommodating recess, and the second terminal end part overlaps the chamfer, in a plan view viewed in a direction perpendicular to the first joint surface, thereby communicating the guide groove to the chamfer.

2. The joined component as claimed in claim 1, wherein the first joint surface includes the guide groove, and the chamfer is formed along the fringe of the second joint surface.

3. The joined component as claimed in claim 2, wherein the chamfer has a depth of 0.05 mm or greater and 1.0 mm or less, and a width of 0.1 mm or greater and 1.5 mm or less.

4. The joined component as claimed in claim 2, wherein the guide groove has a depth of 0.02 mm or greater and 0.2 mm or less, and a width of 0.2 mm or greater and 1.0 mm or less.

5. The joined component as claimed in claim 2, wherein the first member and the second member are sintered bodies.

6. The joined component as claimed in claim 1, wherein the second joint surface includes the guide groove, and the chamfer is formed along the fringe of the first joint surface.

7. The joined component as claimed in claim 6, wherein the chamfer has a depth of 0.05 mm or greater and 1.0 mm or less, and a width of 0.1 mm or greater and 1.5 mm or less.

8. The joined component as claimed in claim 6, wherein the guide groove has a depth of 0.02 mm or greater and 0.2 mm or less, and a width of 0.2 mm or greater and 1.0 mm or less.

9. The joined component as claimed in claim 6, wherein the first member and the second member are sintered bodies.

10. The joined component as claimed in claim 1, wherein the chamfer has a depth of 0.05 mm or greater and 1.0 mm or less, and a width of 0.1 mm or greater and 1.5 mm or less.

11. The joined component as claimed in claim 1, wherein the guide groove has a depth of 0.02 mm or greater and 0.2 mm or less, and a width of 0.2 mm or greater and 1.0 mm or less.

12. The joined component as claimed in claim 1, wherein the first member and the second member are sintered bodies.

13. The joined component as claimed in claim 1, wherein the second member includes a columnar bridge part,
the second joint surface is provided on a tip end of the bridge part, the first joint surface includes the guide groove extending radially from the arranging part at a plurality of locations, thereby forming a plurality of guide grooves, the second joint surface includes the chamfer along the fringe thereof, in the plan view, the second terminal end part of each guide groove of the plurality of guide grooves is positioned in a range overlapping the chamfer, and located between the fringe of the second joint surface and a fringe of the bridge part, and the first member and the second member are sintered bodies.

14. The joined component as claimed in claim 1, wherein the first joint surface includes the guide groove extending in a radial direction from the arranging part at a plurality of non-overlapping locations in the plan view, thereby forming a plurality of guide grooves, the second joint surface includes the chamfer along the fringe thereof, so that the chamfer includes an outer edge coinciding with the fringe of the second joint surface, and an inner edge located on an inner side of the outer edge of the chamfer and on an outer side of the arranging part along the radial direction, and in the plan view, the second terminal end part of each guide groove of the plurality of guide grooves is positioned in a range overlapping the chamfer, and located between the fringe of the second joint surface and the inner edge of the chamfer.

15. The joined component as claimed in claim 1, wherein the second joint surface includes the guide groove extending in a radial direction from the accommodating recess at a plurality of non-overlapping locations in the plan view, thereby forming a plurality of guide grooves, the first joint surface includes the chamfer along the fringe thereof, so that the chamfer includes an outer edge coinciding with the fringe of the first joint surface, and an inner edge located on an inner side of the outer edge of the chamfer and on an outer side of the accommodating recess along the radial direction, and in the plan view, the second terminal end part of each guide groove of the plurality of guide grooves is positioned in a range overlapping the chamfer, and located between the fringe of the first joint surface and the inner edge of the chamfer.

\* \* \* \* \*